Patented Jan. 13, 1948

2,434,313

UNITED STATES PATENT OFFICE 2,434,313

MANUFACTURE OF COMPOUNDS CONTAINING CARBONYL GROUPS

Henry Dreyfus, London, England; Claude Bonard, administrator of said Henry Dreyfus, deceased No Drawing. Application September 23, 1944, Serial No. 555,583. In Great Britain May 25, 1943

5 Claims. (Cl. 260—604)

1

This invention relates to the manufacture of organic compounds containing aldehyde or ketone groups.

I have found that reaction may be caused to take place between aldehydes and olefines or substituted olefines or other organic compounds containing olefinic groups, whereby addition of the aldehyde occurs at the olefinic double bond and a higher aldehyde or ketone is produced. Thus by reaction between formaldehyde and an olefinic compound, an aldehyde is usually produced, although as is described below this reaction can also be made to yield ketones; acetaldehyde and other aldehydes yield only ketones.

An important application of the invention is to the production of dialdehydes by reaction between formaldehyde and straight chain diolefines in which the double bonds are situated at the ends of the chain, and alkyl substitution products of such straight chain diolefines. For instance, by reacting 1:5-hexadiene and 1:3-butadiene with formaldehyde the corresponding dialdehydes are produced; these dialdehydes are of considerable value, especially as intermediates, and are not easily prepared by previously known methods.

The addition reaction between aldehydes and olefinic compounds can be made to take place at room temperatures, but it is then usually rather slow; it is therefore preferable to employ higher temperatures whenever possible, for example temperatures up to 150° C. In many cases however the maximum permissible temperature is limited by the increasing liability of the starting materials to polymerisation, or of the products to polymerisation or some other reaction; for example some dialdehydes may undergo internal condensation and ring closure at high temperatures. It is therefore not possible to set out optimum temperatures that will apply to all reactions of the new type, but each reaction must be separately considered, having regard to the properties both of the starting materials and the products.

When formaldehyde is used to react with diolefines to form dialdehydes, the temperature employed should be such that polymerisation of the diolefine and also internal condensation of the dialdehyde produced are substantially avoided. To this end it is preferable to use temperatures below 100° C., and preferably below about 80° C.; room temperature, e. g. temperature between say 20° and 30° C., may be used, or a more rapid reaction may be obtained by using temperatures of 50°–80° C.

It is preferable to carry out the reaction in the liquid phase, and to ensure as intimate a contact as is possible between the aldehyde and the olefinic compound. For example, when the aldehyde or olefinic compound is normally a vapour at the temperature to be employed, the reaction may be effected under sufficient pressure to liquify it. Moreover the reaction may be effected in a diluent liquid, which may be a solvent for one or both of the reactants. For example, formaldehyde may be used in aqueous solution; thus formalin, which is a 40% solution of formaldehyde in water containing a little methanol, and is a very convenient source of formaldehyde, may be employed in the new process without any purification or concentration of the formaldehyde contained therein. When a large volume of an aqueous diluent is not used, a small amount of water, say 5–15% of the total weight of the aldehyde and olefinic reactants, sometimes assists the reaction.

Especially when working at room temperature and temperatures not greatly exceeding room temperature, a catalyst may be used to accelerate the reaction; examples of suitable catalysts are acids, for instance sulphuric acid, hydrogen chloride, or boric acid; salts of acid reaction, for instance zinc chloride; organic peroxides, for instance benzoyl peroxide; and alkalis. These substances however also frequently act as catalysts in polymerisation reactions, especially in the polymerisation of diolefines, and if they are used in the present reaction, it must be in very small amount.

In the reaction with which the invention is mainly, although not exclusively, concerned, one molecule of aldehyde reacts with each olefinic double bond in the olefinic reactant. Thus two molecular proportions of formaldehyde react with each molecular proportion of diolefine to give a dialdehyde. The reactants may be employed in these proportions exactly, but it is usually preferable to employ a slight excess of the aldehyde, for instance an excess of 5–10% over that theoretically required.

In place of the aldehyde there may be employed a derivative thereof which is capable of reacting as an aldehyde. For example instead of formaldehyde a polymer thereof may be used, such for instance as paraformaldehyde or trioxane, preferably in the presence of a small quantity of acid, or an acetal may be employed, e. g. methylal or formaldehyde di-ethyl acetal. Compounds such as trioxane and methylal may be employed in solution in organic solvents, for example ether, in which olefines and diolefines are also soluble.

In one method of carrying out the invention the aldehyde or aldehyde derivative, the olefinic compound, and any solvent or diluent and any catalyst which it may be desired to employ, may be mixed together, if necessary in a vessel capable of withstanding pressure, and provided with means, e. g. a jacket for a heating fluid, for heating the reactants to the required degree. Advantageously the vessel is fitted with a stirrer, or is adapted to be continuously shaken, so that the reactants are continuously agitated throughout the period needed for the reaction. At the end of the reaction the aldehydic product may be separated in any suitable way from the other constituents of the mixture in the reaction vessel. For example it may be removed from the mixture in solution in a suitable solvent, or the constituents of the mixture may be separated by fractional distillation, preferably under a very low pressure, for example 8–10 mm. or less. If desired the aldehydic products may be separated or purified in the form of derivatives, for instance oximes or bisulphite compounds, from which the aldehyde can subsequently be regenerated.

The invention may be illustrated by the reaction between 1:5-hexadiene and formaldehyde to produce the corresponding dialdehyde. To effect this, formaldehyde in the form of a 40% aqueous solution or as formalin is introduced into a pressure vessel provided with a stirrer, together with slightly less than half the molecular equivalent of 1:5-hexadiene. The mixture is heated to a temperature between about 50° and 80° C., and continuously stirred until no more reaction occurs, the process usually taking a number of hours; the mixture in the reaction vessel is then cooled, and the dialdehyde isolated by extraction with an organic solvent, for example ether or chloroform. The reaction between formaldehyde and 1:3-butadiene may be effected in a similar manner.

Products other than aldehydes may be obtained by reaction, under the conditions set out above, between formaldehyde (or an equivalent compound such as a polymer or acetal of formaldehyde) and olefines, especially diolefines, by varying the proportions of the reactants. As already indicated the production of aldehydes requires the use of at least one molecular equivalent of formaldehyde for each olefinic double bond, and thus at least two molecular equivalents of formaldehyde for each molecular equivalent of diolefine. However, by using a relatively small proportion of formaldehyde, for example one molecule of formaldehyde to every two molecules of diolefine, unsaturated ketones may be obtained in which two molecules of the diolefine are united through a carbonyl group with elimination of one of the double bonds in each of the diolefine molecules. In a similar way saturated ketones may be obtained from mono-olefines, and substituted ketones from other olefinic compounds. A further reaction which may occur, particularly when equimolecular proportions of formaldehyde and diolefines are heated together for a considerable time, results in a polymeric compound of high molecular weight comprising in the structural unit hydrocarbon residues corresponding to the diolefine and linked together by carbonyl groups.

Although the invention has been described with particular reference to the reaction between formaldehyde and olefines, in particular certain diolefines, it is not restricted thereto. Thus the formaldehyde may be replaced by another aldehyde, for example acetaldehyde, propionaldehyde or a homologue thereof, as well as by substituted aldehydes, and these aldehydes may be employed in the monomeric form or in the form of polymers (e. g. metaldehyde, paraldehyde) or in the form of suitable derivatives such as acetals. The diolefines may be replaced by other olefinic compounds, for example unsaturated carboxylic acids, nitriles, halides and other compounds containing, besides the olefinic double bond, any group which does not interfere with the addition of the aldehyde at the double bond. An example of such a reaction is the addition of one molecular proportion of formaldehyde to two molecular equivalents of an unsaturated nitrile, such for example as allyl nitrile or acrylonitrile, whereby a dinitrilo-ketone is obtained which may, if desired, be converted into the corresponding diaminoketone by careful reduction, for example as described in U. S. application Ser. No. 620,180 filed October 3, 1945.

Having described my invention, what I desire to secure by Letters Patent is:

1. Process for the manufacture of aliphatic dialdehydes, which comprises heating a mixture comprising one molecular proportion of a diolefine and at least two molecular proportions of formaldehyde to a temperature of 50° to 80° C., until substantial quantities of the corresponding dialdehyde have been formed, cooling the mixture, and separating therefrom the dialdehyde produced.

2. Process for the manufacture of aliphatic dialdehydes, which comprises heating a mixture of one molecular proportion of a diolefine and at least two molecular proportions of formaldehyde in the form of a 40% aqueous solution to a temperature of 50 to 80° C., until substantial quantities of the corresponding dialdehyde have been formed, cooling the mixture, and separating therefrom the dialdehyde produced.

3. Process for the manufacture of aliphatic dialdehydes, which comprises heating a mixture of one molecular proportion of a straight chain normally fluid diolefine and at least two molecular proportions of formaldehyde in the form of a 40% aqueous solution to a temperature of 50 to 80° C., until substantial quantities of the corresponding dialdehyde have been formed, cooling the mixture, and separating therefrom the dialdehyde produced.

4. Process for the manufacture of suberic dialdehyde, which comprises heating a mixture of one molecular proportion of 1:5-hexadiene and at least two molecular proportions of formaldehyde in the form of a 40% aqueous solution to a temperature of 50 to 80° C., until substantial quantities of suberic dialdehyde have been formed, cooling the mixture, and separating therefrom the dialdehyde produced.

5. Process for the manufacture of adipic dialdehyde, which comprises heating a mixture of one molecular proportion of 1:3-butadiene and at least two molecular proportions of formaldehyde in the form of a 40% aqueous solution to a temperature of 50 to 80° C., until substantial quantities of adipic dialdehyde have been formed, cooling the mixture, and separating therefrom the dialdehyde produced.

HENRY DREYFUS.

FOREIGN PATENTS

The following references are of record in the file of this patent:

UNITED STATES PATENTS

| Number | Name | Date |
|---|---|---|
| 1,944,731 | Diels et al. | Jan. 23, 1934 |
| 2,158,311 | Starck et al. | May 16, 1939 |
| 2,252,333 | Rothrock | Aug. 12, 1941 |
| 2,253,323 | Christman | Aug. 19, 1941 |
| 2,345,138 | Machemer | Mar. 28, 1944 |
| 2,386,735 | Borders | Oct. 9, 1945 |